(12) United States Patent
Matsuda et al.

(10) Patent No.: US 10,717,134 B2
(45) Date of Patent: Jul. 21, 2020

(54) CUTTING TOOL (71) Applicants: SUMITOMO ELECTRIC HARDMETAL CORP., Itami-shi (JP); Sumitomo Electric Industries, Ltd., Osaka-shi (JP)

(72) Inventors: Yusuke Matsuda, Itami (JP); Taisuke Higashi, Itami (JP); Satoru Kukino, Itami (JP); Takashi Kanda, Osaka (JP); Katsumi Okamura, Itami (JP)

(73) Assignees: Sumitomo Electric Hardmetal Corp., Itami-shi (JP); Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/062,739

(22) PCT Filed: Nov. 15, 2016

(86) PCT No.: PCT/JP2016/083859
§ 371 (c)(1),
(2) Date: Jun. 15, 2018

(87) PCT Pub. No.: WO2018/092195
PCT Pub. Date: May 24, 2018

(65) Prior Publication Data
US 2018/0361485 A1    Dec. 20, 2018

(51) Int. Cl.
*B23C 5/10* (2006.01)
*B23B 27/14* (2006.01)
(Continued)

(52) U.S. Cl.
CPC .............. *B23B 27/148* (2013.01); *B22F 5/06* (2013.01); *B22F 7/062* (2013.01); *B23B 27/20* (2013.01);
(Continued)

(58) Field of Classification Search
CPC .............. B23B 27/14; B23B 2226/125; B23B 2226/315; B23B 2251/02; B23B 2224/28;
(Continued)

(56) References Cited

U.S. PATENT DOCUMENTS

| 5,115,697 A | 5/1992 | Rodriguez et al. |
| 6,056,485 A * | 5/2000 | Magill .................... B23C 5/10 |
| | | 407/54 |

(Continued)

FOREIGN PATENT DOCUMENTS

| CN | 102390087 A | 3/2012 |
| EP | 2 582 478 A1 | 4/2013 |

(Continued)

*Primary Examiner* — Sara Addisu
(74) *Attorney, Agent, or Firm* — Baker Botts L.L.P.; Michael A. Sartori (57) ABSTRACT

A cutting tool according to an aspect of the present disclosure includes a shank, a joint, and a cutting portion attached through the joint to the shank. The cutting portion includes a core and a surface portion. The surface portion is disposed around a central axis of the cutting portion to cover an outer circumferential surface of the core. The surface portion includes a cutting edge. The cutting edge is disposed on an outer circumferential surface of the surface portion and formed in a helical shape about the central axis. The surface portion is a composite sintered material including a hard phase formed of a plurality of diamond particles and a plurality of cubic boron nitride particles, and a binder phase forming the remainder.

12 Claims, 4 Drawing Sheets

(51) Int. Cl.
　　　*B23B 27/20*　　　(2006.01)
　　　*C22C 29/00*　　　(2006.01)
　　　*C22C 29/06*　　　(2006.01)
　　　*C22C 26/00*　　　(2006.01)
　　　*B22F 7/06*　　　(2006.01)
　　　*B23D 77/02*　　　(2006.01)
　　　*B22F 5/06*　　　(2006.01)
　　　*B23C 5/16*　　　(2006.01)
　　　*B22F 5/00*　　　(2006.01)

(52) U.S. Cl.
　　　CPC .............. *B23C 5/10* (2013.01); *B23C 5/1018* (2013.01); *B23C 5/1063* (2013.01); *B23C 5/1081* (2013.01); *B23D 77/02* (2013.01); *C22C 26/00* (2013.01); *C22C 29/005* (2013.01); *C22C 29/062* (2013.01); *B22F 2005/001* (2013.01); *B23B 2226/125* (2013.01); *B23B 2226/31* (2013.01); *B23C 5/16* (2013.01); *C22C 2026/003* (2013.01)

(58) Field of Classification Search
　　　CPC ............ B23B 2224/32; B23B 2226/31; B23B 27/148; B23B 27/20; B22F 7/00; B23C 5/10; B23C 5/16; B23C 2226/125; B23C 2226/315; B23C 2240/08; B23C 5/18; B23C 51/10; B23C 51/1009; B23C 51/1018; B23C 51/16; B23C 2228/10; Y10T 407/1904; Y10T 407/1946; Y10T 407/1948; Y10T 407/1952; Y10T 407/1966
　　　See application file for complete search history.

(56) References Cited

U.S. PATENT DOCUMENTS

| | | | | |
|---|---|---|---|---|
| 6,511,265 B1* | 1/2003 | Mirchandani | ............ | B22F 7/06 407/118 |
| 6,551,035 B1* | 4/2003 | Bruhn | .................... | B23B 31/11 408/144 |
| 7,559,382 B2* | 7/2009 | Koch | ..................... | B23B 51/02 175/415 |
| 8,272,816 B2* | 9/2012 | Mirchandani | ........... | B22F 7/062 407/118 |
| 8,926,238 B1* | 1/2015 | Bolin | ........................ | B23C 5/00 408/143 |
| 9,120,155 B2* | 9/2015 | Hecht | ................... | B23B 27/148 |
| 2007/0092761 A1* | 4/2007 | Ohata | ................... | C23C 14/548 428/698 |
| 2008/0206001 A1* | 8/2008 | Bozkurt | ................ | B23D 77/00 407/32 |
| 2009/0214857 A1* | 8/2009 | Itoh | ....................... | C23C 16/403 428/336 |
| 2009/0252564 A1* | 10/2009 | Volokh | ..................... | B23C 5/10 407/11 |
| 2009/0311055 A1* | 12/2009 | Galota | ...................... | B23C 5/28 407/11 |
| 2010/0172703 A1* | 7/2010 | Neubold | .................. | B23C 5/10 407/53 |
| 2011/0206470 A1* | 8/2011 | Waki | ................... | C23C 14/0641 407/119 |
| 2013/0017028 A1* | 1/2013 | Fang | ....................... | B23B 51/02 408/144 |
| 2013/0071620 A1* | 3/2013 | Waki | ................... | C23C 14/0021 428/148 |
| 2013/0209184 A1* | 8/2013 | Barry | ....................... | B23C 5/10 407/54 |
| 2013/0315681 A1* | 11/2013 | Volokh | ................... | B23B 51/02 407/53 |
| 2015/0097321 A1* | 4/2015 | Kasonde | .................. | B22F 3/14 264/626 |
| 2015/0298224 A1* | 10/2015 | Gross | ....................... | B23C 5/10 407/34 |
| 2015/0314379 A1* | 11/2015 | Sharivker | ................. | B23C 5/10 407/34 |
| 2016/0114409 A1* | 4/2016 | Duval | .................... | B23B 51/00 407/54 |
| 2016/0327940 A1 | 11/2016 | Akazawa et al. | | |
| 2018/0318941 A1* | 11/2018 | Chang | .................... | B23C 5/202 |
| 2018/0369924 A1* | 12/2018 | Higashi | ................... | B23C 5/10 |
| 2019/0084047 A1* | 3/2019 | Lehto | ........................ | B23C 5/10 |

FOREIGN PATENT DOCUMENTS

| | | | | |
|---|---|---|---|---|
| EP | 2959996 A1 * | 12/2015 | ............... | B23C 5/10 |
| JP | S56-22676 A | 3/1981 | | |
| JP | 60-043461 A | 3/1985 | | |
| JP | 61-000506 A | 1/1986 | | |
| JP | 62-040340 A | 2/1987 | | |
| JP | H03-010707 A | 1/1991 | | |
| JP | 05-329707 A | 12/1993 | | |
| JP | 06-508566 A | 9/1994 | | |
| JP | 07-185907 A | 7/1995 | | |
| JP | 11-291111 A | 10/1999 | | |
| JP | 2000-263328 A | 9/2000 | | |
| JP | 2004-243466 A | 9/2004 | | |
| KR | 10-2003-0072569 A | 9/2003 | | |
| WO | 93/02823 A1 | 2/1993 | | |
| WO | 02/49801 A1 | 6/2002 | | |
| WO | 2011/157667 A1 | 12/2011 | | |
| WO | 2013/143686 A2 | 10/2013 | | |
| WO | 2013/156536 A1 | 10/2013 | | |
| WO | 2015/105159 A1 | 7/2015 | | |

* cited by examiner

CUTTING TOOL

TECHNICAL FIELD

The present disclosure relates to cutting tools.

BACKGROUND ART

As cutting tools having a cutting edge made of sintered diamond particles or sintered cubic boron nitride (cBN) particles, a reamer disclosed in Japanese Patent Laying-Open No. 2000-263328 (Patent Document 1) and a cutting tool disclosed in Japanese Patent Laying-Open No. 3-10707 (Patent Document 2), for example, have been known.

The reamer disclosed in Patent Document 1 includes a shank, a radial blade portion, and a cutting edge body. The radial blade portion extends from the shank. The shank and the radial blade portion are made of cemented carbide or steel. To the top end of the radial blade portion, the cutting edge body is joined. The cutting edge body is made of sintered diamond or cubic boron nitride particles. Flute blades and flutes are formed on the outer peripheries of the radial blade portion and the cutting edge body. The flute blades and flutes are formed helically about the central axis. Each flute is located between adjacent flute blades.

The cutting tool disclosed in Patent Document 2 includes a tool body and a cutting edge insert. The cutting edge insert is secured to the tool body. The cutting edge insert is made of sintered diamond particles, sintered high pressure phase boron nitride particles, or a sintered mixture of them.

CITATION LIST

Patent Document

PTD 1: Japanese Patent Laying-Open No. 2000-263328
PTD 2: Japanese Patent Laying-Open No. 3-10707

SUMMARY OF INVENTION

A cutting tool according to the present disclosure includes a shank, a joint, and a cutting portion attached through the joint to the shank. The cutting portion includes a core and a surface portion. The surface portion is disposed around a central axis of the cutting portion to cover an outer circumferential surface of the core. The surface portion includes a cutting edge. The cutting edge is disposed on an outer circumferential surface of the surface portion and formed in a helical shape about the central axis. The surface portion is a composite sintered material including a hard phase formed of a plurality of diamond particles and a plurality of cubic boron nitride particles, and a binder phase forming the remainder.

DETAILED DESCRIPTION

Problem to be Solved by the Cutting Tool in the Present Disclosure

Generally, nickel (Ni)-based heat-resistant alloys and the like are considered as difficult-to-cut materials. In order to mill a difficult-to-cut material at a high efficiency, it is necessary for a cutting tool to have wear resistance, fracture resistance, and heat resistance.

As mentioned above, the cutting edge body of the reamer disclosed in Patent Document 1 is made of sintered diamond particles or sintered cubic boron nitride particles. While diamond particles have a high hardness, their heat resistance is susceptible to improvement (diamond starts carbonizing at 600° C. or higher in the air to thereby decrease in hardness, and starts burning at 800° C. or higher). While cubic boron nitride particles have high heat resistance, their hardness is lower than that of diamond particles. The reamer disclosed in Patent Document 1 is therefore susceptible to improvement in terms of wear resistance and fracture resistance.

The cutting edge insert of the cutting tool disclosed in Patent Document 2 may be formed of a sintered mixture of diamond particles and high pressure phase boron nitride. The cutting edge insert of the cutting tool disclosed in Patent Document 2 needs to be secured to the tool body by brazing. Therefore, if any region in the vicinity of the cutting edge insert is increased in temperature by the cutting heat, the brazed portion may be melted. The cutting tool disclosed in Patent Document 2 is therefore susceptible to improvement in terms of heat resistance.

The present disclosure is given in view of the problems of the conventional art as described above. More specifically, the cutting tool in the present disclosure is a cutting tool of which wear resistance, fracture resistance, and heat resistance can be ensured even when a workpiece to be cut is a difficult-to-cut material.

Advantageous Effect of the Present Disclosure

As to the cutting tool according to the present disclosure, its wear resistance, fracture resistance, and heat resistance can be ensured even when a workpiece to be cut is a difficult-to-cut material.

Description of Embodiments of the Disclosure

First of all, aspects of the present disclosure are described one by one.

(1) A cutting tool according to an aspect of the present disclosure includes: a shank; a joint; and a cutting portion attached through the joint to the shank. The cutting portion includes a core and a surface portion. The surface portion is disposed around a central axis of the cutting portion to cover an outer circumferential surface of the core. The surface portion includes a cutting edge. The cutting edge is disposed on an outer circumferential surface of the surface portion and formed in a helical shape about the central axis. The surface portion is a composite sintered material including: a hard phase formed of a plurality of diamond particles and a plurality of cubic boron nitride particles; and a binder phase forming a remainder.

As to the cutting tool of (1) above, its wear resistance, fracture resistance, and heat resistance can be ensured even when a workpiece to be cut is a difficult-to-cut material.

(2) In the cutting tool of (1) above, a volume ratio of the hard phase to the composite sintered material may be in a range from 0.6 to 0.99 inclusive.

As to the cutting tool of (2) above, its wear resistance and fracture resistance can be improved further.

(3) In the cutting tool of (1) above, a volume ratio of the cubic boron nitride particles to the hard phase may be in a range from 0.1 to 0.4 inclusive.

As to the cutting tool of (3) above, its wear resistance and fracture resistance can be improved further.

(4) In the cutting tool of (3) above, the volume ratio of the cubic boron nitride particles to the hard phase may be in a range from 0.2 to 0.4 inclusive.

As to the cutting tool of (4) above, its wear resistance and fracture resistance can be improved further.

(5) In the cutting tool of (1) above, the diamond particles may have a D50 in a range from 0.3 μm to 5 μm inclusive, and the diamond particles may have a D90 of 10 μm or less. In the cutting tool of (1) above, the cubic boron nitride particles may have a D50 in a range from 0.3 μm to 3 μm inclusive, and the cubic boron nitride particles may have a D90 of 5 μm or less.

As to the cutting tool of (5) above, its wear resistance and fracture resistance can be improved further.

(6) In the cutting tool of (5) above, the diamond particles may have a D50 in a range from 0.3 μm to 2 μm inclusive, and the diamond particles may have a D90 of 3 μm or less. In the cutting tool of (5) above, the cubic boron nitride particles may have a D50 in a range from 0.3 μm to 2 μm inclusive, and the cubic boron nitride particles may have a D90 of 3 μm or less.

As to the cutting tool of (6) above, its wear resistance and fracture resistance can be improved further.

(7) In the cutting tool of (1) above, the binder phase may contain cobalt.

As to the cutting tool of (7) above, its wear resistance and fracture resistance can be improved further.

(8) In the cutting tool of (1) to (7) above, the core may be made of cemented carbide containing cobalt. A volume ratio of the cobalt to the cemented carbide may be in a range from 0.1 to 0.2 inclusive.

As to the cutting tool of (8) above, breakage due to a difference in thermal expansion coefficient between the surface portion and the core can be suppressed.

(9) In the cutting tool of (1) to (8) above, the cutting edge may have a helix angle in a range from 35° to 75° inclusive.

As to the cutting tool of (9) above, its wear resistance and fracture resistance can be improved further.

(10) In the cutting tool of (9) above, the helix angle may be in a range from 45° to 70° inclusive.

As to the cutting tool of (10) above, its wear resistance and fracture resistance can be improved further.

(11) In the cutting tool of (10) above, the helix angle may be in a range from 55° to 65° inclusive.

As to the cutting tool of (11) above, its wear resistance and fracture resistance can be improved further.

(12) The cutting tool of (1) to (11) above may further include an attachment joined to the cutting portion by the joint and removably attached to the shank.

Details of Embodiments of the Disclosure

In the following, details of the embodiments of the present disclosure are described with reference to the drawings. In the drawings, the same or corresponding parts are denoted by the same reference characters. The following embodiments may be at least partially combined.

Configuration of Cutting Tool in Embodiment 1

Figure 1:
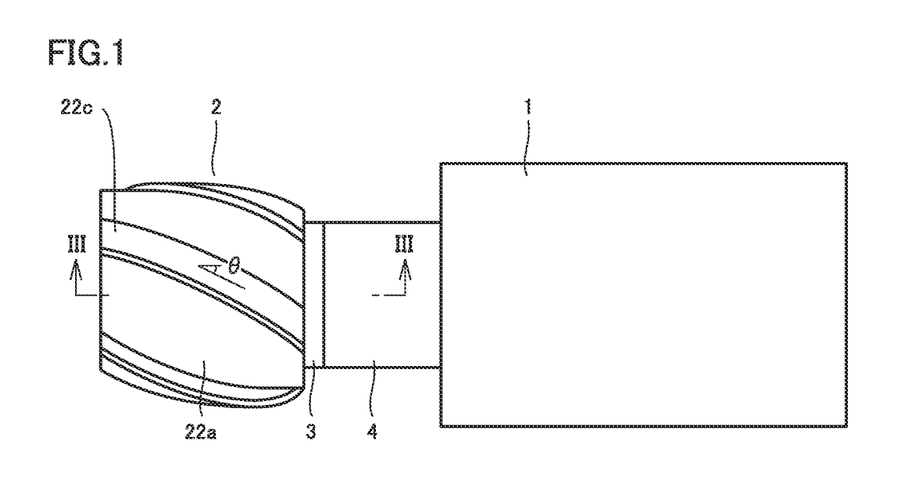
FIG. 1 is a side view of a cutting tool according to Embodiment 1.
Figure 2:
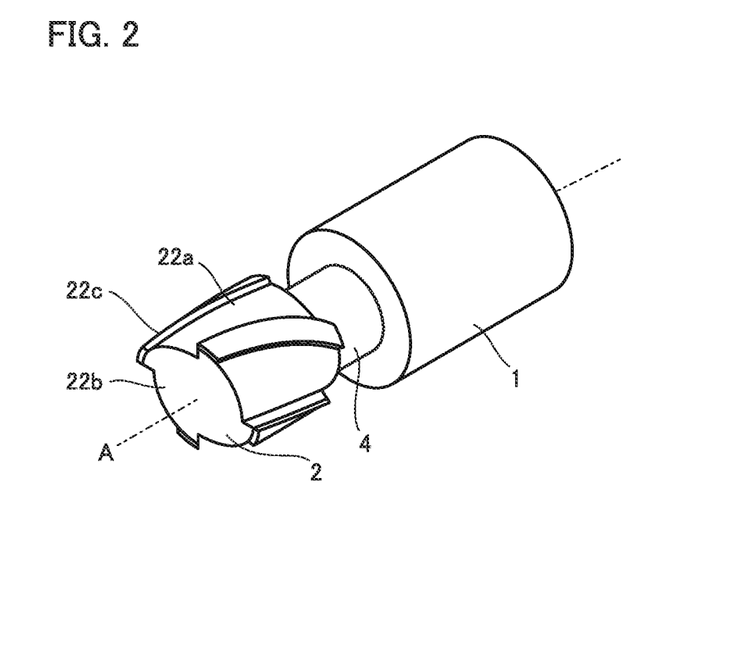
FIG. 2 is a perspective view of the cutting tool according to Embodiment 1.

The following is a description of a configuration of a cutting tool according to Embodiment 1. FIG. 1 is a side view of the cutting tool according to Embodiment 1. FIG. 2 is a perspective view of the cutting tool according to Embodiment 1. As shown in FIGS. 1 and 2, the cutting tool according to Embodiment 1 has central axis A.

The cutting tool according to Embodiment 1 includes a shank 1, a cutting portion 2, and a joint 3. The cutting tool according to Embodiment 1 may include an attachment 4. Shank 1 of the cutting tool according to Embodiment 1 is attached to a main shaft of a machine tool. Cutting portion 2 is attached through joint 3 to shank 1 with joint 3 interposed between the cutting portion and the shank. If the cutting tool according to Embodiment 1 includes attachment 4, cutting portion 2 may be attached through attachment 4 to shank 1 with attachment 4 interposed therebetween. Specifically, cutting portion 2 is joined to attachment 4 by joint 3 and attachment 4 is removably attached to shank 1, and thereby cutting portion 2 is attach to shank 1. If the cutting tool according to Embodiment 1 does not include attachment 4, cutting portion 2 is attached to shank 1 by joining joint 3 to shank 1.

Respective central axes of shank 1, cutting portion 2, and attachment 4 coincide with central axis A. For joint 3, a material containing one iron-based element or two or more different iron-based elements, such as cobalt (Co), iron (Fe), and nickel (Ni), for example, is used. For attachment 4, cemented carbide or cermet, for example, is used.

Figure 3:
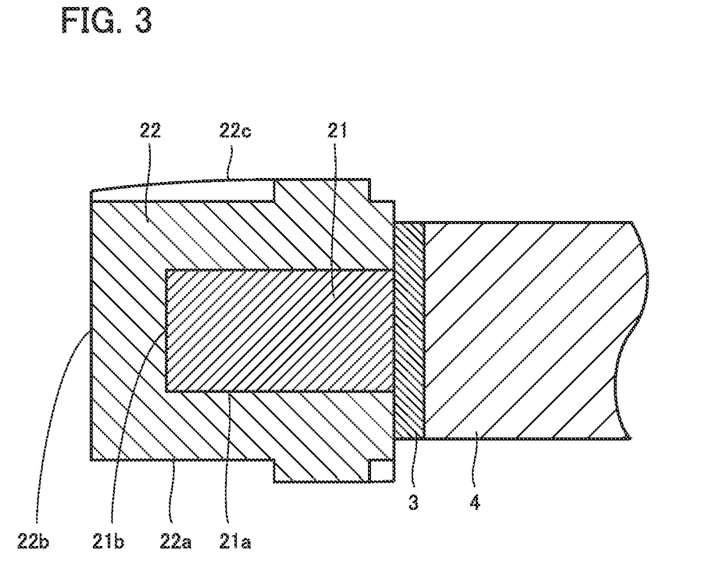
FIG. 3 is a cross-sectional view along III-III in FIG. 1.

FIG. 3 is a cross-sectional view along III-III in FIG. 1. While FIG. 3 shows attachment 4, cutting portion 2 of the cutting tool according to Embodiment 1 may be attached through joint 3 to shank 1, without attachment 4, as described above. As shown in FIG. 3, cutting portion 2 includes a core 21 and a surface portion 22. Core 21 has a columnar shape. Preferably, core 21 may have a cylindrical shape. Core 21 includes an outer circumferential surface 21a and top surface 21b.

Core 21 is made of cemented carbide, for example. The cemented carbide is an alloy produced by sintering a binder phase and a hard phase such as tungsten carbide (WC). For the binder phase of the cemented carbide, cobalt may be used, for example. The material forming core 21, however, is not limited to this. The material forming core 21 may be cermet, for example. Cermet is an alloy produced by sintering a binder phase and a hard phase such as titanium carbide (TiC), tantalum carbide (TaC), and niobium carbide (NbC).

In the case where core 21 is made of the cemented carbide, the volume ratio of cobalt to the cemented carbide forming core 21 is in a range from 0.1 to 0.2 inclusive, for example.

In the case where core 21 is made of the cemented carbide, the volume ratio of cobalt in core 21 is measured in the following way. First, crystal grains of cobalt in a given cross section of core 21 are identified by EDX (energy dispersive X-ray spectrometry). Next, the area ratio of the cobalt crystal grains in the cross section is measured. Then, the measured area ratio of cobalt is regarded as a volume ratio of the binder phase to the cemented carbide forming core 21.

Surface portion 22 is disposed around central axis A (i.e., disposed around central axis A of cutting portion 2) to thereby cover outer circumferential surface 21a of core 21. Surface portion 22 may also be described as being disposed on outer circumferential surface 21a of core 21. Core 21 and surface portion 22 are joined to each other. Surface portion 22 has a tubular shape. Preferably, surface portion 22 has a cylindrical shape. Surface portion 22 may cover top surface 21b of core 21. In other words, surface portion 22 may be disposed also on top surface 21b of core 21.

Surface portion 22 includes an outer circumferential surface 22a and a top surface 22b. Top surface 22b is a flat surface, for example. Surface portion 22 includes a cutting edge 22c. In other words, cutting edge 22c is integrated into surface portion 22. Cutting edge 22c is disposed on outer circumferential surface 22a. Preferably, cutting edge 22c disposed on outer circumferential surface 22a has a helical shape about central axis A. A plurality of cutting edges 22c may be formed. Cutting edge 22c may be formed not only on surface portion 22 but also on other portions (at least one of core 21, joint 3, and attachment 4).

Cutting edge 22c has helix angle $\theta$. Helix angle $\theta$ is an angle formed between twisted cutting edge 22c and central axis A. Helix angle $\theta$ is in a range from 35° to 75° inclusive, for example. Preferably, helix angle $\theta$ is in a range from 45° to 70° inclusive. Particularly preferably, helix angle $\theta$ is in a range from 55° to 65° inclusive.

Surface portion 22 is made of a composite sintered material. More specifically, surface portion 22 is a sintered material containing a plurality of diamond particles, a plurality of cubic boron nitride particles, and a binder phase. In the following, diamond particles and cubic boron nitride particles may collectively be referred to as hard phase. The binder phase forms the remainder of the composite sintered material, i.e., the composite sintered material contains diamond particles, cubic boron nitride particles, and the remainder being the binder phase. The composite sintered material may contain an inevitable impurity. It should be noted that the composite sintered material containing an inevitable impurity is also an example of the composite sintered material containing diamond particles, cubic boron nitride particles, and the remainder being the binder phase.

Preferably, the diamond particles in the composite sintered material form a skeleton structure. Specifically, diamond particles arranged adjacent to each other in the composite sintered material are preferably bonded at least partially to each other.

The binder phase may contain cobalt. In the case where the binder phase contains cobalt, the binder phase may further contain elements such as nickel, molybdenum (Mo), chromium (Cr), tungsten (W), aluminum (Al), for example.

The binder phase may additionally contain elements such as titanium (Ti), zirconium (Zr), hafnium (Hf), niobium (Nb), tantalum (Ta), silicon (Si), for example.

The volume ratio of the hard phase to the composite sintered material is preferably in a range from 0.6 to 0.99 inclusive.

The volume ratio of the hard phase to the composite sintered material is measured in the following way. First, in a given cross section of the composite sintered material, crystal grains constituting the hard phase are identified by EDX. Next, based on the result of the identification, the area ratio of the hard phase in the cross section is measured. Then the measured area ratio of the hard phase is regarded as a volume ratio of the hard phase to the composite sintered material.

Preferably, the volume ratio of the cubic boron nitride particles contained in the composite sintered material to the hard phase is in a range from 0.1 to 0.5 inclusive. Particularly preferably, the volume ratio of the cubic boron nitride particles contained in the composite sintered material to the hard phase is in a range from 0.2 to 0.4 inclusive.

The volume ratio of the cubic boron nitride particles contained in the composite sintered material to the hard phase is measured in the following way. First, in a given cross section of the composite sintered material, diamond particles and cubic boron nitride particles are identified by EDX. Next, each of the area of the hard phase and the area of the cubic boron nitride particles in the cross section are measured. Then, the area of the cubic boron nitride particles in the cross section is divided by the area of the hard phase, and the determined quotient is regarded as a volume ratio of the cubic boron nitride particles contained in the composite sintered material, to the hard phase.

Preferably, the diamond particles contained in the composite sintered material have a D50 in a range from 0.3 μm to 5 μm inclusive. Preferably, the diamond particles contained in the composite sintered material have a D90 of 10 μm or less. Preferably, the cubic boron nitride particles contained in the composite sintered material have a D50 in a range from 0.3 μm to 3 μm inclusive. The cubic boron nitride particles contained in the composite sintered material have a D90 of 5 μm or less.

Particularly preferably, the diamond particles contained in the composite sintered material have a D50 in a range from 0.3 μm to 2 μm inclusive. Particularly preferably, the diamond particles contained in the composite sintered material have a D90 of 3 μm or less. Particularly preferably, the cubic boron nitride particles contained in the composite sintered material have a D50 in a range from 0.3 μm to 2 μm inclusive. Particularly preferably, the cubic boron nitride particles contained in the composite sintered material have a D90 of 3 μm or less.

In the case where the sum of respective volumes of crystal particles smaller in particle size than a specific value is equal to the sum of respective volumes of crystal particles larger in particle size than the specific value, this value is D50. In the case where the sum of respective volumes of crystal particles smaller in particle size than a specific value is 90% of the total volume of the crystal particles, this value is D90.

The above D50 and D90 are measured in the following way. First, in a given cross section of the composite sintered material, diamond particles (cubic boron nitride particles) are identified by EDX. Next, image analysis software is used to calculate the cross-sectional area of each diamond particle (cubic boron nitride particle). Subsequently, from the cross-sectional area of each diamond particle (cubic boron nitride particle), the diameter of an equivalent circle of the diamond particle (cubic boron nitride particle) is calculated. The cross-sectional area of each diamond particle (cubic boron nitride particle) is divided by the total area of the diamond particles (cubic boron nitride particles) in the cross section to thereby calculate the area ratio of each diamond particle (cubic boron nitride particle). The calculated ratio of the cross-sectional area of each diamond particle (cubic boron nitride particle) is regarded as the volume ratio of the diamond particle (cubic boron nitride particle), and the calculated diameter of the equivalent circle is regarded as the crystal particle size of each diamond particle (cubic boron nitride particle). These numerical values are used to determine D50 and D90 of diamond particles (cubic boron nitride particles).

In the case where the volume ratio of the hard phase to the composite sintered material, the volume ratio of the cubic boron nitride particles to the hard phase, D50 and D90 of the diamond particles contained in the composite sintered material, and D50 and D90 of the cubic boron nitride particles contained in the composite sintered material satisfy the above-specified ranges of respective numerical values, the skeleton structure of the diamond particles is formed in the composite sintered material.

Figure 4:
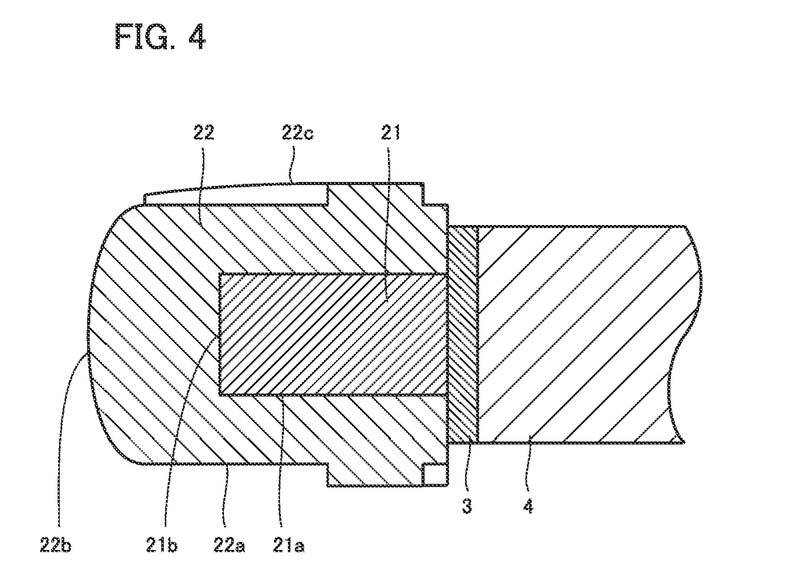
FIG. 4 is a cross-sectional view of a cutting portion of a cutting tool according to Modification 1 of Embodiment 1.
Figure 5:
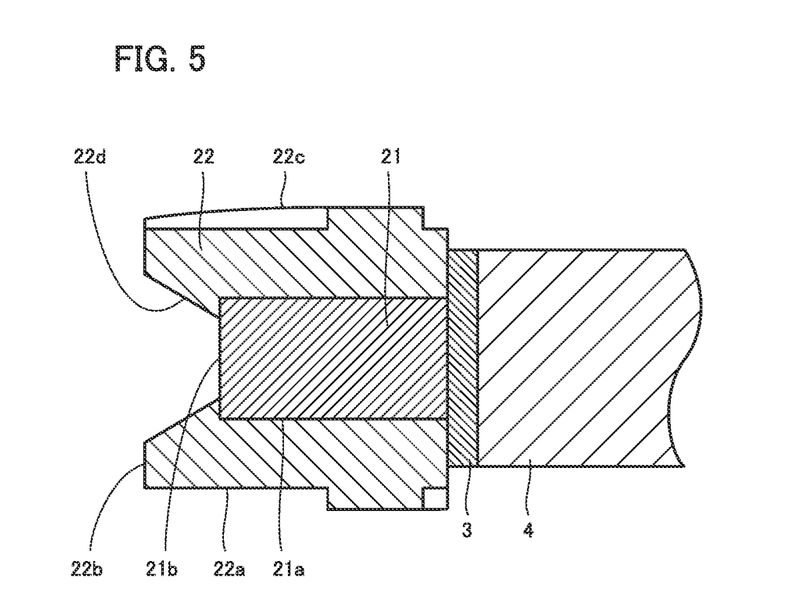
FIG. 5 is a cross-sectional view of a cutting portion of a cutting tool according to Modification 2 of Embodiment 1.

FIG. 4 is a cross-sectional view of a cutting portion of a cutting tool according to Modification 1 of Embodiment 1. As shown in FIG. 4, top surface 22b of surface portion 22 is a curved surface. FIG. 5 is a cross-sectional view of a cutting portion of a cutting tool according to Modification 2 of Embodiment 1. As shown in FIG. 5, surface portion 22 has a hole 22d. Hole 22d is disposed on the top surface 22b side of surface portion 22. Hole 22d has a conical shape, for example. Hole 22d may be a through hole extending through surface portion 22 to reach core 21. While FIGS. 4 and 5 show attachment 4, the cutting tools according to Modifications 1 and 2 of Embodiment 1 may not have attachment 4 and cutting portion 2 may be attached through joint 3 to shank 1, as described above.

Method for Manufacturing Cutting Tool in Embodiment 1

Figure 6:
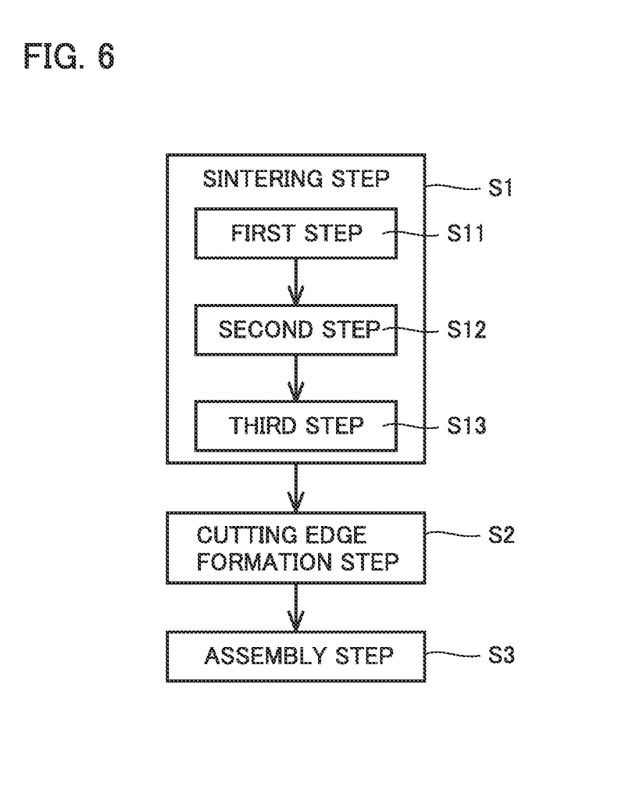
FIG. 6 is a process chart illustrating a method for manufacturing the cutting tool according to Embodiment 1.

In the following, a method for manufacturing the cutting tool according to Embodiment 1 is described. FIG. 6 is a process chart illustrating the method for manufacturing the cutting tool according to Embodiment 1. As shown in FIG. 6, the method for manufacturing the cutting tool in Embodiment 1 includes sintering step S1, cutting edge formation step S2, and assembly step S3.

Sintering step S1 includes first step S11, second step S12, and third step S13. In first step S11, materials that are to form a composite sintered material are prepared. Specifically, powder of diamond particles, powder of cubic boron nitride particles, and powder of material(s) forming the binder phase are prepared. Instead of using the powder of material(s) forming the binder phase, the powder of diamond particles and the powder of cubic boron nitride particles may be coated with the material(s) forming the binder phase.

In second step S12, the powder of diamond particles, the powder of cubic boron nitride particles and the powder of material(s) forming the binder phase are mixed together. For the mixing, ball mill mixing, bead mill mixing, planetary mill mixing, jet mill mixing, or the like may be used. In the following, the powder of diamond particles, the cubic boron nitride powder, and the powder of material(s) forming the binder phase that are mixed together in second step S12 may be referred to as powder mixture.

In third step S13, sintering is performed to produce the composite sintered material. In third step S13, firstly the powder mixture obtained in second step S12 is placed in a mold. In third step S13, secondly the core 21 is pressed into the powder mixture placed in the mold, and thirdly the powder mixture placed in the mold is heated and applied with a sintering pressure. Accordingly, the composite sintered material forming surface portion 22 is produced, and also core 21 and surface portion 22 are joined to each other.

The heating temperature is in a range from 1400° C. to 2000° C. inclusive, for example. Preferably, the heating temperature is in a range from 1500° C. to 1800° C. inclusive. The sintering pressure is in a range from 4 GPa to 10 GPa inclusive, for example. Preferably, the sintering pressure is in a range from 6 GPa to 8 GPa inclusive. The sintering time is in a range from 15 minutes to 60 minutes inclusive, for example.

In cutting edge formation step S2, cutting edge 22c is formed. Cutting edge 22c is formed by polishing outer circumferential surface 22a of surface portion 22. Cutting edge 22c may be formed by laser processing of outer circumferential surface 22a of surface portion 22. Accordingly, cutting portion 2 is formed.

In assembly step S3, assembly of the cutting tool according to Embodiment 1 is performed. The assembly of the cutting tool in Embodiment 1 is accomplished by causing cutting portion 2 formed in cutting edge formation step S2 to be joined to attachment 4 through joint 3, and attaching attachment 4 to shank 1. Attachment 4 may be attached to shank 1 by means of screwing, pinning, or through other manners of engagement, press fit, brazing, or the like. Accordingly, the method for manufacturing the cutting tool according to Embodiment 1 is completed.

Advantageous Effects of Cutting Tool in Embodiment 1

A description is given below of advantageous effects of the cutting tool according to Embodiment 1. Regarding the cutting tool according to Embodiment 1, cutting edge 22c is integrated with surface portion 22. In other words, cutting edge 22c of the cutting tool according to Embodiment 1 is not attached by means of brazing or the like. Therefore, in the cutting tool according to Embodiment 1, the peripheral region of cutting edge 22c is not melted by cutting heat and thus breakage of the peripheral region of cutting edge 22c is less likely to occur.

In the cutting tool according to Embodiment 1, surface portion 22 including cutting edge 22c is formed of a composite sintered material. The hard phase in the composite sintered material is formed of diamond particles and cubic boron nitride particles. The cutting tool according to Embodiment 1 therefore has heat resistance, wear resistance, and fracture resistance of cutting edge 22c. For this reason, as to the cutting tool according to Embodiment 1, its wear resistance, fracture resistance, and heat resistance are ensured, even when the workpiece to be cut is a difficult-to-cut material.

In the cutting tool according to Embodiment 1, in the case where a skeleton structure of diamond particles is formed in the composite sintered material, cracks generated in cubic boron nitride particles are hindered from propagating through the composite sintered material. It is therefore possible to further improve the wear resistance and the fracture resistance of the cutting tool.

In the cutting tool according to Embodiment 1, in the case where core 21 is made of cemented carbide containing cobalt as a binder phase and the volume ratio of cobalt to the cemented carbide is in a range from 0.1 to 0.2 inclusive, the difference in thermal expansion coefficient between the composite sintered material and core 21 is small. In this case, therefore, core 21 can be prevented from peeling off between core 21 and surface portion 22.

Cutting Test

In order to confirm further details of the advantageous effects of the cutting tool according to Embodiment 1, a first cutting test, a second cutting test, and a third cutting test were conducted as described below.

<First Cutting Test>

A workpiece for a first cutting test was Inconel®718 which is a nickel-based heat resistant alloy considered as a hard-to-cut material. For the first cutting test, cutting conditions including a cutting speed V of 500 mm/sec, a feed per tooth fz of 0.05 mm/tooth, a width of cut Ae of 0.5 mm, and a depth of cut Ap of 0.3 mm were applied. As a cutting oil, an emulsion-type cutting oil (dilution factor: 20) was used.

Table 1 shows D50 and D90 of diamond particles included in a composite sintered material of each of cutting tools in Examples 1 to 12, D50 and D90 of cubic boron nitride particles included in the composite sintered material, the volume ratio between the diamond particles and the cubic boron nitride particles included in the composite sintered material, the type of the material as a binding phase, and helix angle θ of cutting edge 22c. In Table 1, the tool life found by the first cutting test for each of the cutting tools in Examples 1 to 12 is shown.

The tool life was evaluated based on the cutting length at the time when flank wear width VB reached 0.1 mm or fracture occurred to cutting edge 22c.

material falls in a range from 0.3 μm to 2 μm inclusive, and D90 of the cubic boron nitride particles included in the composite sintered material falls in a range of 3 μm or less.

In the cutting tools in Examples 9 to 12, like the cutting tools in Examples 1 to 8, the volume ratio of the hard phase to the composite sintered material falls in a range from 0.6 to 0.99 inclusive, and the volume ratio of the cubic boron nitride particles to the hard phase falls in a range from 0.1 to 0.5 inclusive.

In the cutting tool in Example 9, however, D50 of the diamond particles included in the composite sintered material does not fall in the range from 0.3 μm to 5 μm inclusive, and D50 of the cubic boron nitride particles included in the composite sintered material does not fall in the range from 0.3 μm to 3 μm inclusive.

TABLE 1

|  |  | Example 1 | Example 2 | Example 3 | Example 4 | Example 5 | Example 6 |
|---|---|---|---|---|---|---|---|
| diamond | D50 (μm) | 0.3 | 0.5 | 1 | 2 | 5 | 1 |
|  | D90 (μm) | 1 | 1.5 | 2.3 | 3 | 10 | 2.3 |
|  | volume ratio | 0.6 | 0.6 | 0.6 | 0.6 | 0.6 | 0.6 |
| cubic boron nitride | D50 (μm) | 0.3 | 0.3 | 0.5 | 1.5 | 3.0 | 0.5 |
|  | D90 (μm) | 1.0 | 1.0 | 2.0 | 3.0 | 5.0 | 2.0 |
|  | volume ratio | 0.2 | 0.2 | 0.2 | 0.2 | 0.2 | 0.2 |
| binder phase |  | Co | Co | Co | Co | Co | Co, Ni |
| helix angle (°) |  | 60 | 60 | 60 | 60 | 60 | 60 |
| cutting length (m) |  | 3.2 | 3.3 | 3.5 | 3.4 | 2.7 | 3.4 |

|  |  | Example 7 | Example 8 | Example 9 | Example 10 | Example 11 | Example 12 |
|---|---|---|---|---|---|---|---|
| diamond | D50 (μm) | 1 | 1 | 0.1 | 8 | 0.1 | 1 |
|  | D90 (μm) | 2.3 | 2.3 | 1 | 12 | 1 | 2.3 |
|  | volume ratio | 0.6 | 0.6 | 0.6 | 0.6 | 0.6 | 0.6 |
| cubic boron nitride | D50 (μm) | 0.5 | 0.5 | 0.1 | 0.1 | 5 | 0.5 |
|  | D90 (μm) | 2 | 2 | 1 | 1 | 10 | 2 |
|  | volume ratio | 0.2 | 0.2 | 0.2 | 0.2 | 0.2 | 0.2 |
| binder phase |  | Co, Mo | Co, Cr | Co | Co | Co | Al |
| helix angle (°) |  | 60 | 60 | 60 | 60 | 60 | 60 |
| cutting length (m) |  | 3.2 | 3.3 | 2.0 | 1.9 | 2.2 | 0.90 |

As shown in Table 1, the cutting tools in Examples 1 to 8 are longer in tool life than the cutting tools in Examples 9 to 12. The cutting tools in Examples 1 to 4 and 6 to 8 are particularly longer in tool life.

In the cutting tools in Examples 1 to 8, the volume ratio of the hard phase to the composite sintered material falls in a range from 0.6 to 0.99 inclusive, and the volume ratio of the cubic boron nitride particles to the hard phase falls in a range from 0.1 to 0.5 inclusive.

In the cutting tools in Examples 1 to 8, D50 of the diamond particles included in the composite sintered material falls in a range from 0.3 μm to 5 μm inclusive, and D90 of the diamond particles included in the composite sintered material falls in a range of 10 μm or less. In the cutting tools in Examples 1 to 8, D50 of the cubic boron nitride particles included in the composite sintered material falls in a range from 0.3 μm to 3 μm inclusive, and D90 of the cubic boron nitride particles included in the composite sintered material falls in a range of 5 μm or less.

In the cutting tools in Examples 1 to 4 and 6 to 8, D50 of the diamond particles included in the composite sintered material falls in a range from 0.3 μm to 2 μm inclusive, and D90 of the diamond particles included in the composite sintered material falls in a range of 3 μm or less. In the cutting tools in Examples 1 to 4 and 6 to 8, D50 of the cubic boron nitride particles included in the composite sintered In the cutting tool in Example 10, D50 of the diamond particles included in the composite sintered material does not fall in the range from 0.3 μm to 5 μm inclusive, D90 of the diamond particles included in the composite sintered material does not fall in the range of 10 μm or less, and D50 of the cubic boron nitride particles included in the composite sintered material does not fall in the range from 0.3 μm to 3 μm inclusive.

Further, in the cutting tool in Example 11, D50 of the diamond particles included in the composite sintered material does not fall in the range from 0.3 μm to 5 μm inclusive, D50 of the cubic boron nitride particles included in the composite sintered material does not fall in the range from 0.3 μm to 3 μm inclusive, and D90 of the cubic boron nitride particles included in the composite sintered material does not fall in the range of 5 μm or less.

In the cutting tool in Example 12, the material forming the binder phase does not contain cobalt (the binder phase is formed of aluminum), in contrast to the cutting tools in Examples 1 to 11.

From the foregoing test results, it has been confirmed that the wear resistance and the fracture resistance of the cutting tool are further improved by satisfying: D50 of the diamond particles included in the composite sintered material falls in a range from 0.3 μm to 5 μm inclusive; D90 of the diamond particles included in the composite sintered material falls in a range of 10 μm or less; D50 of the cubic boron nitride particles included in the composite sintered material falls in a range from 0.3 μm to 3 μm inclusive; and D90 of the cubic boron nitride particles included in the composite sintered material falls in a range of 5 μm or less.

Moreover, from the foregoing test results, it has been confirmed that the wear resistance and the fracture resistance of the cutting tool are still further improved by satisfying: D50 of the diamond particles included in the composite sintered material falls in a range from 0.3 μm to 2 μm inclusive; D90 of the diamond particles included in the composite sintered material falls in a range of 3 μm or less; D50 of the cubic boron nitride particles included in the composite sintered material falls in a range from 0.3 μm to 2 μm inclusive; and D90 of the cubic boron nitride particles included in the composite sintered material falls in a range of 3 μm or less.

From the foregoing test results, it has also been confirmed that the wear resistance and the fracture resistance are further improved by satisfying a condition that the composite sintered material includes cobalt as a binder phase.

<Second Cutting Test>

A workpiece for a second cutting test was Inconel®718 as in the first cutting test. For the second cutting test, cutting conditions including a cutting speed V of 500 mm/sec, a feed per tooth fz of 0.15 mm/tooth, a width of cut Ae of 0.1 mm, and a depth of cut Ap of 0.3 mm were applied. As a cutting oil, an emulsion-type cutting oil (dilution factor: 20) was used.

Table 2 shows D50 and D90 of diamond particles included in a composite sintered material of each of cutting tools in Examples 13 to 24, D50 and D90 of cubic boron nitride particles included in the composite sintered material, the volume ratio between the diamond particles and the cubic boron nitride particles included in the composite sintered material, the type of the material as a binding phase, and helix angle θ of cutting edge 22c. In Table 2, the tool life found by the second cutting test for each of the cutting tools in Examples 13 to 24 is shown.

The tool life was also evaluated based on the cutting length at the time when flank wear width VB reached 0.1 mm or fracture occurred to cutting edge 22c.

As shown in Table 2, the cutting tools in Examples 13 to 20 are longer in tool life than the cutting tools in Examples 21 to 24. The cutting tools in Examples 13 to 16, 18, and 19 are particularly longer in tool life.

In the cutting tools in Examples 13 to 24, D50 of the diamond particles included in the composite sintered material falls in a range from 0.3 μm to 2 μm inclusive. In the cutting tools in Examples 13 to 24, D90 of the diamond particles included in the composite sintered material falls in a range of 3 μm or less. In the cutting tools in Examples 13 to 24, D50 of the cubic boron nitride particles included in the composite sintered material falls in a range from 0.3 μm to 2 μm inclusive, and D90 of the cubic boron nitride particles included in the composite sintered material falls in a range of 3 μm or less.

In the cutting tools in Examples 13 to 20, the volume ratio of the hard phase to the composite sintered material falls in a range from 0.6 to 0.99 inclusive, and the volume ratio of the cubic boron nitride particles to the hard phase falls in a range from 0.1 to 0.5 inclusive. In the cutting tools in Examples 13 to 16, 18 and 19, the volume ratio of the cubic boron nitride particles to the hard phase falls in a range from 0.2 to 0.4 inclusive.

However, in the cutting tools in Examples 22 and 23, the volume ratio of the hard phase to the composite sintered material does not fall in the range from 0.6 to 0.99 inclusive. In the cutting tools in Examples 24 and 25, the volume ratio of the cubic boron nitride particles to the hard phase does not fall in the range from 0.1 to 0.5 inclusive.

From the foregoing test results, it has been confirmed that the wear resistance and the fracture resistance are further improved by satisfying a condition that the volume ratio of the hard phase to the composite sintered material falls in a range from 0.6 to 0.99 inclusive.

Moreover, from the foregoing test results, it has been confirmed that the wear resistance and the fracture resistance are further improved by satisfying a condition that the volume ratio of the cubic boron nitride particles to the hard phase falls in a range from 0.1 to 0.5 inclusive.

Further, from the foregoing test results, it has been confirmed that the wear resistance and the fracture resistance are still further improved by satisfying a condition that the

TABLE 2

| | | Example 13 | Example 14 | Example 15 | Example 16 | Example 17 | Example 18 |
|---|---|---|---|---|---|---|---|
| diamond | D50 (μm) | 1 | 1 | 1 | 1 | 1 | 1 |
| | D90 (μm) | 2.3 | 2.3 | 2.3 | 2.3 | 2.3 | 2.3 |
| | volume ratio | 0.45 | 0.5 | 0.65 | 0.74 | 0.72 | 0.64 |
| cubic boron nitride | D50 (μm) | 0.5 | 0.5 | 0.5 | 0.5 | 0.5 | 0.5 |
| | D90 (μm) | 2 | 2 | 2 | 2 | 2 | 2 |
| | volume ratio | 0.15 | 0.2 | 0.25 | 0.25 | 0.08 | 0.16 |
| binder phase | | Co, Al | Co, Al | Co, Al | Co, Al | Co, W | Co, W |
| helix angle (°) | | 60 | 60 | 60 | 60 | 60 | 60 |
| cutting length (m) | | 2.0 | 2.4 | 2.5 | 2.1 | 1.8 | 2.3 |

| | | Example 19 | Example 20 | Example 21 | Example 22 | Example 23 | Example 24 |
|---|---|---|---|---|---|---|---|
| diamond | D50 (μm) | 1 | 1 | 1 | 1 | 1 | 1 |
| | D90 (μm) | 2.3 | 2.3 | 2.3 | 2.3 | 2.3 | 2.3 |
| | volume ratio | 0.48 | 0.4 | 0.4 | 0.3 | 0.72 | 0.32 |
| cubic boron nitride | D50 (μm) | 0.5 | 0.5 | 0.5 | 0.5 | 0.5 | 0.5 |
| | D90 (μm) | 2 | 2 | 2 | 2 | 2 | 2 |
| | volume ratio | 0.32 | 0.4 | 0.1 | 0.1 | 0.04 | 0.48 |
| binder phase | | Co, W | Co, W | Co | Co | Co | Co |
| helix angle (°) | | 60 | 60 | 60 | 60 | 60 | 60 |
| cutting length (m) | | 2.1 | 2.0 | 1.4 | 0.5 | 0.5 | 0.1 | volume ratio of the cubic boron nitride particles to the hard phase falls in a range from 0.2 to 0.4 inclusive.

<Third Cutting Test>

A workpiece for a third cutting test was Inconel®718 as in the first and second cutting tests. For the third cutting test, cutting conditions including a cutting speed V of 500 mm/sec, a feed per tooth fz of 0.15 mm/tooth, a width of cut Ae of 0.5 mm, and a depth of cut Ap of 0.3 mm were applied. As a cutting oil, an emulsion-type cutting oil (dilution factor: 20) was used.

Table 3 shows D50 and D90 of diamond particles included in a composite sintered material of each of cutting tools in Examples 25 to 31, D50 and D90 of cubic boron nitride particles included in the composite sintered material, the volume ratio between the diamond particles and the cubic boron nitride particles included in the composite sintered material, the type of the material as a binding phase, and helix angle θ of cutting edge 22c. In Table 3, the tool life found by the third cutting test for each of the cutting tools in Examples 25 to 31 is shown. The cutting tools in Examples 25 to 31 differ from each other in helix angle θ only.

In the cutting tools in Examples 25 to 31, D50 of the diamond particles included in the composite sintered material falls in a range from 0.3 μm and 2 μm inclusive, and D90 of the diamond particles included in the composite sintered material falls in a range of 3 μm or less. Further, in the cutting tools in Examples 25 to 31, D50 of the cubic boron nitride particles included in the composite sintered material falls in a range from 0.3 μm to 2 μm inclusive, and D90 of the cubic boron nitride particles included in the composite sintered material falls in a range of 3 μm or less.

In the cutting tools in Examples 25 to 31, the volume ratio of the hard phase to the composite sintered material falls in a range from 0.6 to 0.99 inclusive, and the volume ratio of the cubic boron nitride particles to the hard phase falls in a range from 0.1 to 0.5 inclusive.

TABLE 3

| | | Example 25 | Example 26 | Example 27 | Example 28 | Example 29 | Example 30 | Example 31 |
|---|---|---|---|---|---|---|---|---|
| diamond | D50 (μm) | 1 | 1 | 1 | 1 | 1 | 1 | 1.0 |
| | D90 (μm) | 2.3 | 2.3 | 2.3 | 2.3 | 2.3 | 2.3 | 2.3 |
| | volume ratio | 0.6 | 0.6 | 0.6 | 0.6 | 0.6 | 0.6 | 0.60 |
| cubic | D50 (μm) | 0.5 | 0.5 | 0.5 | 0.5 | 0.5 | 0.5 | 0.50 |
| boron | D90 (μm) | 2 | 2 | 2 | 2 | 2 | 2 | 2.0 |
| nitride | volume ratio | 0.2 | 0.2 | 0.2 | 0.2 | 0.2 | 0.2 | 0.20 |
| | binder phase | Co | Co | Co | Co | Co | Co | Co |
| | helix angle (°) | 35 | 45 | 55 | 65 | 75 | 25 | 85 |
| | cutting length (m) | 1.5 | 1.8 | 2.0 | 2.2 | 2.0 | 0.5 | 0.3 |

As shown in Table 3, as helix angle θ is smaller, the tool life is relatively shorter (Example 30). As helix angle θ increases, the tool life tends to be improved (Examples 25 to 29). However, as helix angle θ is excessively larger, the tool life tends to be relatively shorter (Example 31).

From the foregoing test results, it has been confirmed that helix angle θ is preferably in a range from 35° to 75° inclusive, more preferably in a range from 45° to 70° inclusive, and particularly preferably in a range from 55° to 65° inclusive.

Configuration of Cutting Tool in Embodiment 2

The following is a description of a configuration of a cutting tool according to Embodiment 2. The following description mainly relates to differences from Embodiment 1, and the same description is not repeated herein.

The cutting tool according to Embodiment 2 is similar to the cutting tool in Embodiment 1, except for the volume ratio of the diamond particles to the composite sintered material, the volume ratio of the cubic boron nitride particles to the composite sintered material, D50 and D90 of the diamond particles included in the composite sintered material, and D50 and D90 of the cubic boron nitride particles included in the composite sintered material.

In the cutting tool according to Embodiment 2, the volume ratio of the diamond particles to the composite sintered material is preferably in a range from 0.3 to 0.94 inclusive. In the cutting tool according to Embodiment 2, the volume ratio of the diamond particles to the composite sintered material is more preferably in a range from 0.5 to 0.7 inclusive. In the cutting tool according to Embodiment 2, D50 and D90 of the diamond particles included in the composite sintered material are preferably 10 μm or less. In the cutting tool according to Embodiment 2, D50 and D90 of the diamond particles included in the composite sintered material are more preferably 2 μm or less.

In the cutting tool according to Embodiment 2, the volume ratio of the cubic boron nitride particles to the composite sintered material is preferably in a range from 0.03 to 0.4 inclusive. In the cutting tool according to Embodiment 2, the volume ratio of the cubic boron nitride particles to the composite sintered material is more preferably in a range from 0.1 to 0.4 inclusive. In the cutting tool according to Embodiment 2, D50 and D90 of the cubic boron nitride particles included in the composite sintered material are preferably 2 μm or less. In the cutting tool according to Embodiment 2, D50 and D90 of the diamond particles included in the composite sintered material are more preferably 1 μm or less.

The volume ratio of the diamond particles to the composite sintered material is measured in the following way. First, in a given cross section of the composite sintered material, diamond particles are identified by EDX. Next, based on the result of the identification, the area ratio of the diamond particles in the cross section is measured. Then the measured area ratio of the diamond particles is regarded as a volume ratio of the diamond particles to the composite sintered material. The volume ratio of the cubic boron nitride particles to the composite sintered material is also measured in a similar way.

The definitions of D50 and D90 of the diamond particles (cubic boron nitride particles) and the method for measuring them are those as described above.

Method for Manufacturing Cutting Tool in Embodiment 2

A method for manufacturing the cutting tool according to Embodiment 2 is similar to the method for manufacturing the cutting tool according to Embodiment 1.

Advantageous Effect of Manufacturing Cutting Tool in Embodiment 2

As to the cutting tool according to Embodiment 2, a skeleton structure of diamond particles is formed in the composite sintered material. The wear resistance and the fracture resistance of the cutting tool according to Embodiment 2 can therefore be improved still further.

It should be construed that the embodiments disclosed herein are given by way of illustration in all respects, not by way of limitation. It is intended that the scope of the present disclosure is defined by claims, not by the above embodiments, and encompasses all modifications and variations equivalent in meaning and scope to the claims.

REFERENCE SIGNS LIST 1 shank; 2 cutting portion; 3 joint; 4 attachment; A central axis; 21 core; 21a outer circumferential surface; 21b top surface; 22 surface portion; 22a outer circumferential surface; 22b top surface; 22c cutting edge; 22d hole; A1 sintering step; S11 first step; S12 second step; S13 third step; S2 cutting edge formation step; S3 assembly step; V cutting speed; VB wear width; fz feed per tooth; Ae width of cut; Ap depth of cut; θ helical angle

The invention claimed is:

1. A cutting tool comprising:
a shank;
a joint; and
a cutting portion attached through the joint to the shank, the cutting portion including:
 a core; and
 a surface portion disposed around a central axis of the cutting portion to cover an outer circumferential surface of the core,
the surface portion including a cutting edge disposed on an outer circumferential surface of the surface portion and formed in a helical shape about the central axis,
the surface portion being a composite sintered material including:
 a hard phase formed of a plurality of diamond particles and a plurality of cubic boron nitride particles; and
 a binder phase forming a remainder,
wherein the diamond particles arranged adjacent to each other in the composite sintered material are bonded at least partially to each other.

2. The cutting tool according to claim 1, wherein a volume ratio of the hard phase to the composite sintered material is in a range from 0.6 to 0.99 inclusive.

3. The cutting tool according to claim 1, wherein a volume ratio of the cubic boron nitride particles to the hard phase is in a range from 0.1 to 0.4 inclusive.

4. The cutting tool according to claim 3, wherein the volume ratio of the cubic boron nitride particles to the hard phase is in a range from 0.2 to 0.4 inclusive.

5. The cutting tool according to claim 1, wherein
the diamond particles have a D50 in a range from 0.3 μm to 5 μm inclusive,
the diamond particles have a D90 of 10 μm or less,
the cubic boron nitride particles have a D50 in a range from 0.3 μm to 3 μm inclusive, and
the cubic boron nitride particles have a D90 of 5 μm or less.

6. The cutting tool according to claim 5, wherein
the diamond particles have a D50 in a range from 0.3 μm to 2 μm inclusive,
the diamond particles have a D90 of 3 μm or less,
the cubic boron nitride particles have a D50 in a range from 0.3 μm to 2 μm inclusive, and
the cubic boron nitride particles have a D90 of 3 μm or less.

7. The cutting tool according to claim 1, wherein the binder phase contains cobalt.

8. The cutting tool according to claim 1, wherein
the core is made of cemented carbide containing cobalt, and
a volume ratio of the cobalt to the cemented carbide is in a range from 0.1 to 0.2 inclusive.

9. The cutting tool according to claim 1, wherein the cutting edge has a helix angle in a range from 35° to 75° inclusive.

10. The cutting tool according to claim 9, wherein the helix angle is in a range from 45° to 70° inclusive.

11. The cutting tool according to claim 10, wherein the helix angle is in a range from 55° to 65° inclusive.

12. The cutting tool according to claim 1, further comprising an attachment joined to the cutting portion by the joint and removably attached to the shank.

* * * * *